United States Patent [19]

Hahn, III et al.

[11] Patent Number: 4,956,643

[45] Date of Patent: Sep. 11, 1990

[54] TRANSPONDER WITH SELECTIVE ANTENNA BEAM USING SHARED ANTENNA FEED ELEMENTS

[75] Inventors: Carl J. Hahn, III, Inglewood; Arnold L. Berman, Los Angeles, both of Calif.

[73] Assignee: HAC, Los Angeles, Calif.

[21] Appl. No.: 346,105

[22] Filed: May 2, 1989

[51] Int. Cl.$^5$ ............................. H04J 3/06; G01S 9/00
[52] U.S. Cl. ........................................ 342/51; 342/368
[58] Field of Search .................... 342/368, 51; 455/12, 455/13

[56] References Cited

U.S. PATENT DOCUMENTS

| | | |
|---|---|---|
| 4,090,199 | 5/1978 | Archer . |
| 4,188,578 | 2/1980 | Reudink et al. . |
| 4,232,266 | 11/1980 | Acampora ............................. 370/79 |
| 4,381,652 | 4/1983 | Acampora . |
| 4,425,639 | 1/1984 | Acampora et al. .................... 370/50 |
| 4,430,732 | 2/1984 | Saga et al. .......................... 455/12 X |
| 4,492,960 | 1/1985 | Hislop . |
| 4,703,327 | 10/1987 | Rossetti et al. .................... 342/51 X |

Primary Examiner—Thomas H. Tarcza
Assistant Examiner—Mark Hellner
Attorney, Agent, or Firm—Robert A. Westerlund; Steven M. Mitchell; Wanda K. Denson-Low

[57] ABSTRACT

A transponder that selectively provides both global and spot beam antenna coverage. The transponder comprises a channel amplifier and an antenna feed network that includes coupler means for coupling energy into a plurality of power distribution networks that feed a plurality of antenna radiating elements that form a beam that illuminates the desired coverage area. A variable power divider is coupled to the amplifier that variably couples power along two channel output paths. Each output path includes a matched bandpass filter and the second output path includes a phase delay circuit. Selective control of the ratio of the power coupled to the respective output paths, and the phase delay provided by the phase delay circuit, provides for selective coupling of the total power provided by the channel amplifier to either the full set, or a selected subset of the antenna elements which generates global and spot beams, respectively. A more complex version is described which additionally incorporates an N-channel multiplexer. The present invention may also be employed as an interface circuit that may be interposed between a transponder channel amplifier and an antenna feed network to retrofit existing transponders to provide for selectable beam coverage.

10 Claims, 2 Drawing Sheets

TRANSPONDER WITH SELECTIVE ANTENNA BEAM USING SHARED ANTENNA FEED ELEMENTS

BACKGROUND

The present invention relates generally to relay station transponders and more particularly to orbital relay station transponder, such as are used in geosynchronous communication satellites, that selectively provides for both global and spot beam antenna coverage.

Conventional satellite transponders have been developed that provide for global and spot beam coverage. One conventional transponder with a selective antenna beam comprises a set of transponder channels that are respectively coupled to two multiplexers. Each multiplexer feeds its own antenna network which each comprises an array of power couplers, phase shifters and feed elements. A selectable channel is separately coupled by way of a variable power divider to the respective multiplexers and hence to the two antenna networks. The selectable channels can selectably power one of the antenna arrays to provide a spot beam or both of the arrays to provide a zonal beam. Reference is made to an article by Robert F. Buntschuh entitled "First Generation RCA Direct Broadcast Satellites," IEEE Journal on Selected Areas in Communications, Vol. SAC-3, No. 1, Jan. 1985., for example, which describes such a conventional antenna beam transponder.

Alternately, in a second conventional transponder, a set of transponder channels are coupled by way of a multiplexer to an antenna network comprising a set of hybrid couplers, phase shifters and feed elements that produce global beam coverage. A selected number of the transponder channels have transfer switches that couple power to a separate single antenna network to provide spot beam coverage. Reference is made to an article by M. D. Harwood et al., entitled "The Aussat Spacecraft Communications Payload: An Overview," IREECON '83, Sydney, Australia, Sept. 1983, for example, which describes such a conventional antenna beam transponder.

These conventional transponders utilize either two full multiplexers in the first case, or a second multiplexer for the switched channels and two separate antennas in the second case to provide for the distinct zonal and spot beam coverage. Such transponder designs are complex, costly to manufacture and have excessive weight which in many instances cannot be tolerated, such as in a spacecraft application where weight is a major concern.

Accordingly, it would be desirable to have a transponder that minimizes the number of components required to provide both global and spot beam coverage, has less weight, and which is less costly to manufacture.

SUMMARY OF THE INVENTION

In order to overcome the above-mentioned limitations of conventional approaches, the present invention comprises a transponder that selectively provides both global and spot beam coverage without adding antenna elements or unnecessarily duplicating multiplexers. In its simplest configuration, the transponder comprises a channel amplifier that amplifies microwave energy and an antenna. An antenna feed network comprises an input coupler, such as a hybrid coupler, and a plurality of power distribution networks that feed a plurality of antenna radiating element arrays that are adapted to form a beam that illuminates the desired coverage area.

A variable power divider is coupled to the amplifier that variably couples power along two transponder output paths. A first bandpass filter is disposed in the first output path and is coupled between a first output of the variable power divider and a first coupler port of the antenna network by way of an output N-channel multiplexer. A phase delay circuit, such as a phase shifter, for example, and a matched second bandpass filter are serially disposed in the second output path and are coupled between a second output of the variable power divider and a second coupler port of the antenna network without using a full N-channel output multiplexer.

Selective control of the ratio of the power coupled to the respective output paths, and the phase delay provided by the phase delay circuit, provides for selective coupling of the total power provided by the transponder to either one, or both, of the coupler ports, which in turn generates global and spot beams radiated by either the entire set of antenna elements or a selected subset of antenna elements, respectively.

In a typical operational embodiment, the present invention comprises a plurality of nonselectable transponder channels and at least one selectable channel that are coupled by way of a multiplexer to the antenna feed network. The selectable and nonselectable channels drive all elements of the antenna network. The selectable channel includes the variable power divider that couples power through the phase shifter to the antenna network along a separate power path. The selectable channel may be employed to power a selected subset of antenna elements in the array, thus providing for selective spot beam coverage. Any additional switchable channels require individual power dividers and phase shifters and lead to a limited multiplexer on the second coupler port. The savings realized by this invention are largest when the number of switchable channels is a small percentage of the total number of channels.

The present invention also contemplates an interface circuit that may be interposed between a transponder amplifier and an antenna network. In this embodiment the present invention comprises the variable power divider, a first bandpass filter, the phase shifter and a matched second bandpass filter. These components may be packaged in a manner that allows connection to a conventional transponder amplifier and to an antenna feed network through the second port of its input coupler. This may be implemented in conventional systems since the second port of the input coupler, which in many instances is a hybrid coupler, is typically terminated, and is hence unused in conventional systems.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

3 able channel in accordance with the principles of the present invention.

DETAILED DESCRIPTION

Figure 1:
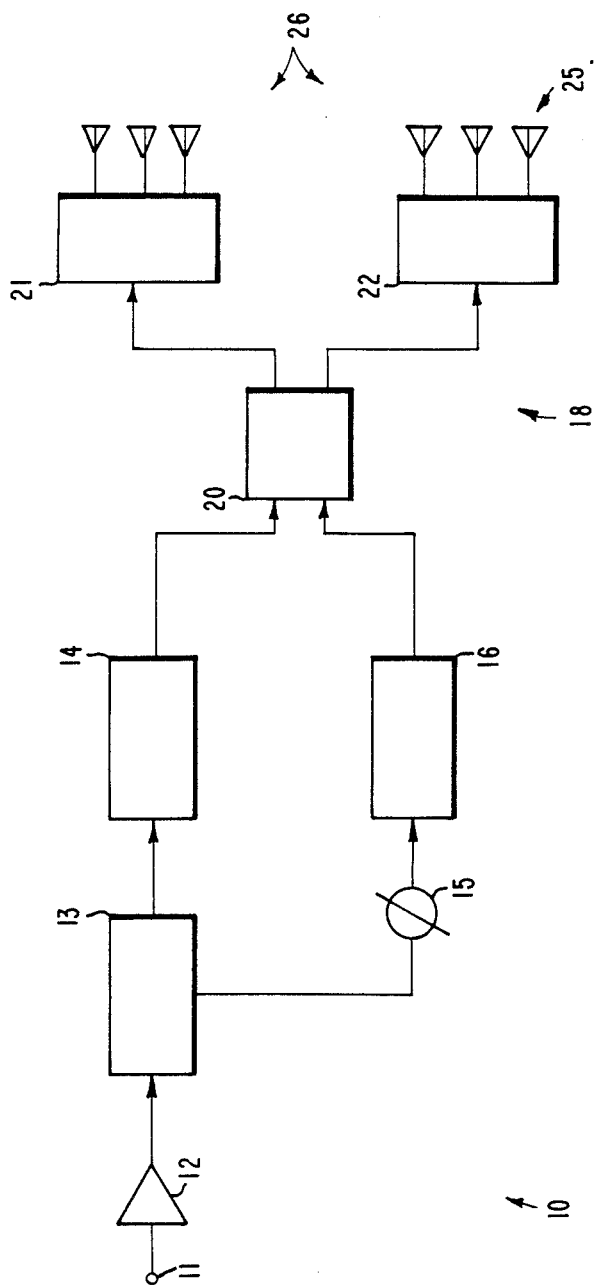
FIG. 1 is a diagram illustrating the nucleus of the transponder with a switchable beam in accordance with the principles of the present invention.

Referring to FIG. 1, a diagram illustrating a transponder 10 with a switchable beam in accordance with the principles of the present invention is shown. The transponder 10 comprises an input 11 that is adapted to receive microwave energy, and a high power microwave amplifier 12. The amplifier 12 is coupled to a variable power divider 13. One of the many possible embodiments of the variable power divider is a geneally well known structure that comprises the following components, for example. A housing encloses two orthomode tees that are adapted to convert orthogonal $TE_{11}$ circular waveguide modes into two separate $TE_{10}$ rectangular waveguide modes. A fixed quarter wave plate is disposed adjacent the input of the divider and is adapted to convert an applied signal into a circularly polarized signal. A rotatable quarter wave plate is disposed along the transmission path whose rotation is adapted to divide the power between two output ports as a function of polarization. Variable power dividers are generally well-known in the art and will not be discussed in detail herein. Embodiments of the variable power divider other than that just described may be employed in the present invention with no change in the nature of the present invention.

One output port of the variable power divider 12 is coupled by way of a first bandpass filter 14 to one input of an input coupler 20 that comprises the input device of an antenna feed network 18. The other output port of the variable power divider 13 is coupled by way of a phase shifter 15 and a second bandpass filter 16 to the second input of the input coupler 20. The bandpass filters 14, 16 are conventional devices, and as such will not be discussed in detail herein. These filters 14, 16 are only required for the purpose of ensuring that both paths have substantially identical electrical characteristics other than the desired phase shift. Consequently, they may not always be required in all circumstances. The phase shifter 15 is also a conventional device, and reference is made to U.S. Pat. No. 3,267,395 issued to Keeling et al. for "Microwave Phase Shifter," which details a typical phase shifter that may be adapted for use in the present invention. The antenna feed network 18 comprises an input coupler 20, whose outputs are respectively coupled to two antenna distribution networks 21, 22, that are in turn coupled to an antenna array comprising a set of antenna elements 26, that includes a subset of antenna elements 25.

In operation, the transponder 10 of the present invention provides for two distinct beams, comprising a global beam and a spot beam, for example. Microwave energy is applied to the input 11, amplified by the amplifier 12, and in the case of the global beam, all the power is applied along the first path through the first bandpass filter 14. The energy is coupled by way of the input coupler 20 to all elements of the set of antenna elements 26. If a spot beam is desired, the variable power divider 13 is configured to couple a predetermined portion of the applied power along the second path through the phase shifter 15 and second bandpass filter 16 to the second port of the input coupler 20. Consequently, the power is coupled only to the subset of antenna elements 25 and a spot beam is radiated therefrom. The phase shifter 15 is configured to properly change the phase of the power transmitted thereby in order for the total energy arriving at the two input ports of the input coupler 20 to add in the direction of the spot beam network 25 and to cancel in the direction of the remaining elements of the network 26.

Figure 2:
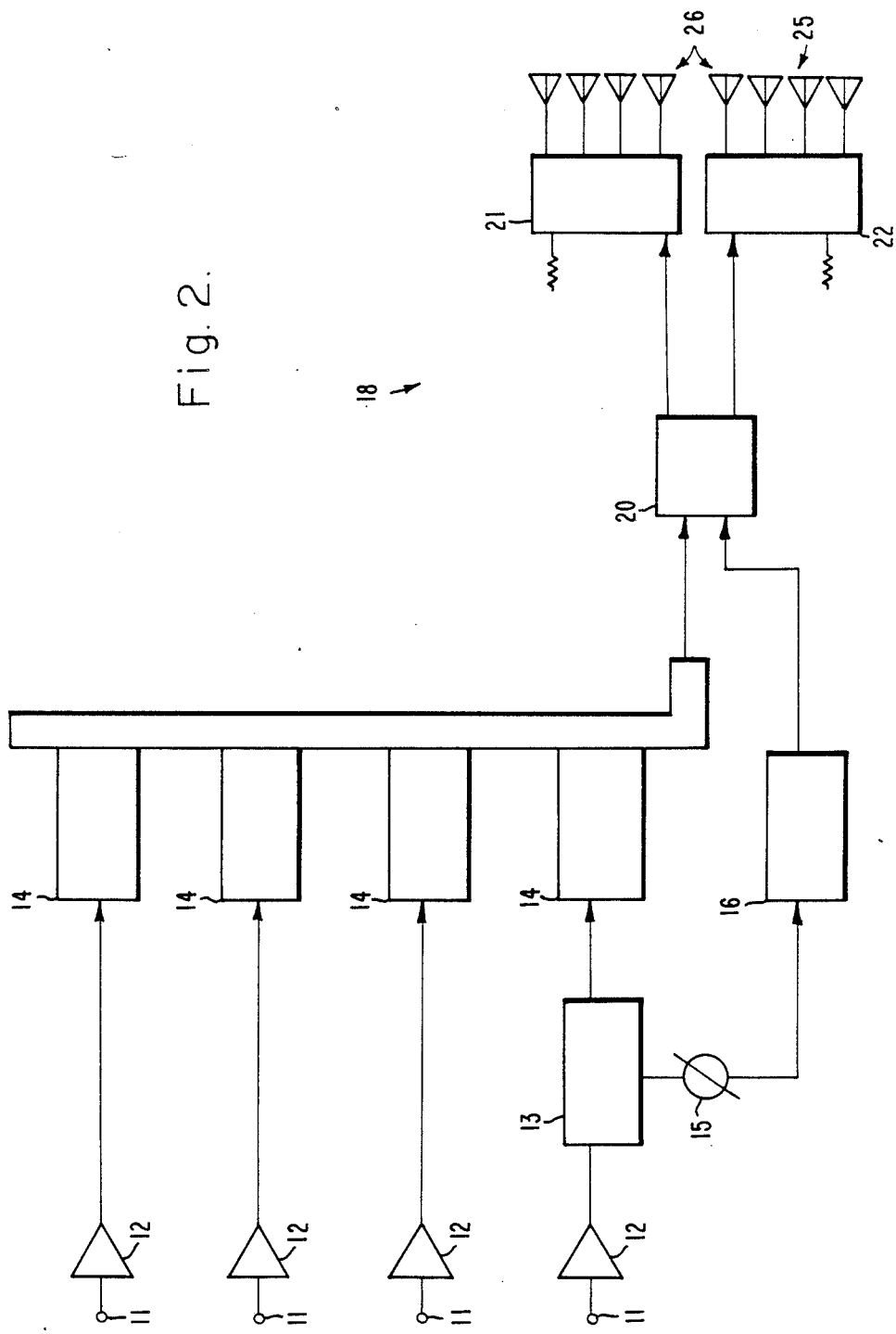
FIG. 2 is a diagram illustrating a typical operating configuration of the transponder showing one switch-

Referring to FIG. 2, a diagram illustrating a typical operating configuration of a transponder in accordance with the principles of the present invention is shown. In this embodiment, a plurality of nonselectable transponder channels 31 are provided in addition to the channel described with reference to FIG. 1, and these channels 31 are coupled to the antenna feed network 18 by way of a conventional multiplexer 30. Reference is made to U.S. Pat. No. 4,777,459 issued to Hudspeth, for "Microwave Multiplexer with Multimode Filter," which describes a conventional multiplexer that may be adapted for use in the embodiment of FIG. 2.

In operation, the nonselectable channels 31 along with the selectable channel provide power to the antenna feed network through the multiplexer 30. The input coupler 20 couples this power to all elements of the array of antenna elements 26, thus providing for global beam coverage. In the event that spot beam coverage is desired, the variable power divider 13 is configured to couple power from the selectable channel to the second input of the input coupler 20, which in turn couples all the power to only those elements in the subset of antenna elements 25, resulting in the desired spot beam.

Although the present invention has been described with reference to a transponder that incorporates amplification and an antenna feed network, it is also contemplated that an interface circuit embodying the concepts of the present invention may also be designed that interfaces between an existing channel amplifier and an antenna beam network. In this embodiment, and with reference to FIG. 1, the present invention comprises the variable power divider 13, the first bandpass filter 14, the phase shifter 15 and the second bandpass filter 17. These four components may be packages in a manner that allows connection to a conventional transponder channel amplifier, such as amplifier 12, and to an antenna feed network 18 through the second port of the input coupler 20. This may be accomplished in conventional systems since the second port of the input coupler 20 is typically terminated, and is hence unused in conventional systems. It is a simple modification to adapt existing transponder systems to incorporate the elements comprising the interface circuit of the present invention. The switchable phase delayed path employed in the present invention and the injection of the signal from this path into the antenna terminal which is normally terminated is believed to be quite unique.

The circuit switches a signal that is ordinarily distributed to a set of antenna feed array elements, to a desired subset of the same elements. The subset provides a spot beam coverage area with higher effective isotropic radiated power than the coverage area provided by the full set of antenna elements. With the power divider 13 and input coupler 20 typically providing 3 dB coupling values, power increases on the order of 3dB are realized. However, with different coupling values in the power divider 13 and hybrid coupler 20, any values of improvement may be obtained. This circuit provides the advantages of (1) switchable spot beams without requiring additional feed elements, antenna networks, structures or reflectors, thus minimizing antenna weight and complexity, (2) it minimizes the weight and size of output multiplexers by requiring no more additional filters than those needed for the switchable channels, and (3) it provides the above advantages simultaneously. Previous circuits and methods have required either full multiplexers with all channels duplicated regardless of which ones were switchable, or alternatively, entirely separate spot beam antennas would be required. These approaches however, typically impact spacecraft weight and complexity in an adverse manner.

Thus, there has been described a new and improved antenna beam transponder that selectably provides for zonal beam coverage and spot beam coverage on a channel by channel basis. Also, there has been described an interface circuit that may be employed with conventional transponders to generate global and zonal beam profiles. The transponder and interface circuit of the present invention minimize the number of components required to provide both global and spot beam coverage, and provide for a system that has less weight, and is less costly to manufacture.

It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:
1. A transponder comprising:
   amplifier means for amplifying signal energy;
   a variable power divider coupled to the amplifier means for variably coupling power along two output paths;
   phase delay means disposed in one output path; and
   an antenna feed network comprising an energy distribution network and a plurality of antenna elements and coupler means coupled to the two output paths for selectively coupling energy to the plurality of antenna elements and to a selected subset of the plurality of antenna elements;
   whereby selective control of the ratio of the power coupled to the respective output paths, and the phase delay provided by the phase delay circuit, provides for selective coupling of the power provided by the transponder to either the plurality of antenna elements or the selected subset of antenna elements, which selective coupling generates first and second predetermined beams radiated by the selected antenna elements.
2. The transponder of claim 1 further comprising: first and second matched bandpass filters disposed in the first and second output paths, respectively.
3. The transponder of claim 1 further comprising:
   at least one nonselectable transponder channel comprising amplifier means for amplifying signal energy within a predetermined energy band; and
   a multiplexer coupled to the selectable and nonselectable transponder channels for coupling power provided thereby to the antenna feed network along the first output path.
4. The transponder of claim 3 further comprising:
   a bandpass filter disposed in the nonselectable transponder channel.
5. The transponder of claim 1 further comprising:
   a plurality of nonselectable transponder channels, each transponder channel comprising amplifier means for amplifying signal energy within a predetermined energy band; and
   a multiplexer coupled to each of the transponder channels and to the selectable transponder channel for coupling power provided thereby to the antenna feed network along the first output path.
6. A transponder comprising:
   transponder amplifier means for amplifying signal energy within a predetermined energy band;
   an antenna feed network comprising coupler means coupled to a plurality of power distribution networks that feed a plurality of antenna element arrays;
   a variable power divider coupled to the transponder amplifier means for variably coupling power along two transponder output paths;
   a bandpass filter disposed in the first output path and coupled between a first output of the variable power divider and a first input port of the coupler means of the antenna network;
   a phase delay circuit and a bandpass filter disposed in the second output path and coupled between a second output of the variable power divider and a second input port of the coupler means of the antenna network;
   whereby selective control of the ratio of the power coupled to the respective output paths, and the phase delay provided by the phase delay circuit, provides for selective coupling of the power provided by the transponder to either one, or both, of the input ports, which selective coupling generates first and second predetermined beams provided by selected subsets of antenna elements of the antenna network.
7. The transponder of claim 6 further comprising:
   a plurality of nonselectable transponder channels, each transponder channel comprising amplifier means for amplifying signal energy within a predetermined energy band; and
   a multiplexer coupled to each of the transponder channels and to the selectable transponder channel for coupling power provided thereby to a first input port of the coupler means.
8. A circuit that interfaces between a single channel transponder amplifier and an antenna network, said circuit comprising:
   a variable power divider device adapted to receive input power from the transponder amplifier;
   a first output path coupled between a first output of the variable power divider and a first input port of coupler means to the antenna network;
   a second output path comprising a phase delay circuit coupled between a second output of the variable power divider and a second input port of the coupler means to the antenna network;
   whereby selective control of the ratio of the power coupled to the respective output paths, and the phase delay provided by the phase delay circuit, provides for selective coupling of the total power provided by the transponder amplifier to all of the antenna elements or a selected subset thereof, which selective coupling generates global and spot beams, respectively.
9. A circuit that interfaces between a channel amplifier of a multi-channel transponder and an antenna network, said circuit comprising:
   a variable power divider device adapted to receive input power from the channel amplifier;
   a first output path coupling a first output of the variable power divider to an input of a selected channel filter of an output multiplexer that is coupled to a first input of coupler means to the antenna network;

a second output path comprising a phase delay circuit and a matching bandpass filter coupled between a second output of the variable power divider and a second input port of the coupler means to the antenna network;

whereby selective control of the ratio of the power coupled to the respective output paths, and the phase delay provided by the phase delay circuit, provides for selective coupling of the power provided by the transponder channel amplifier to either one, or both, of the input ports of the coupler means to the antenna network, which selective coupling generates first and second predetermined beams provided by selected sets of antenna elements of the antenna network.

10. A circuit that selectively distributes power to a set of antenna elements of an antenna network and a selected subset of antenna elements thereof, said circuit comprising:

a variable power divider adapted to receive input power from a channel amplifier of a transponder;

a first output path comprising a bandpass filter coupled between a first output of the variable power divider and a first input port of coupler means to the antenna network;

a second output path comprising a phase delay circuit and a matching bandpass filter coupled between a second output of the variable power divider and a second input port of the coupler means to the antenna network;

whereby selective control of the ratio of the power coupled to the respective output paths, and the phase delay provided by the phase delay circuit, provides for selective coupling of the power provided by the channel amplifier to either the set of antenna elements or the selected subset of antenna elements, which selective coupling provides for first and second predetermined beams provided by respective ones of the selected sets of antenna elements.

* * * * *